(12) United States Patent
Murphy et al.

(10) Patent No.: US 6,743,516 B2
(45) Date of Patent: Jun. 1, 2004

(54) HIGHLY DURABLE HYDROPHOBIC COATINGS AND METHODS

(75) Inventors: Nestor P. Murphy, Monroe, MI (US); Rudolph H. Petrmichl, Ann Arbor, MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/921,303

(22) Filed: Aug. 3, 2001

(65) Prior Publication Data

US 2002/0064663 A1 May 30, 2002

Related U.S. Application Data (60) Provisional application No. 60/236,335, filed on Sep. 29, 2000.

(51) Int. Cl.⁷ .................... B32B 25/20; B32B 13/04; B32B 33/00

(52) U.S. Cl. .................... 428/447; 428/426; 428/428; 428/429; 428/446

(58) Field of Search ........................ 428/447, 446, 428/426, 428, 429

(56) References Cited

U.S. PATENT DOCUMENTS

| | | | |
|---|---|---|---|
| 3,637,416 A | * 1/1972 | Misch et al. ........ 428/412 |
| 3,808,027 A | * 4/1974 | Anderson et al. ........ 428/332 |
| 4,118,540 A | 10/1978 | Amort et al. ........ 428/447 |
| 4,166,891 A | 9/1979 | Elliott ........ 525/329 |
| 4,263,350 A | 4/1981 | Valimont |
| 4,263,371 A | 4/1981 | Franz ........ 428/432 |
| 4,274,856 A | 6/1981 | Frey et al. ........ 65/24 |
| 4,301,197 A | 11/1981 | Franz et al. ........ 427/353 |
| 4,478,909 A | 10/1984 | Taniguchi et al. ........ 428/331 |
| 4,539,061 A | 9/1985 | Sagiv ........ 156/278 |
| 4,547,432 A | 10/1985 | Pitts et al. ........ 428/448 |
| 4,567,221 A | 1/1986 | Maruyama et al. ........ 524/436 |
| 4,711,820 A | 12/1987 | Arkles et al. ........ 428/429 |
| 4,753,827 A | 6/1988 | Yoldas et al. ........ 427/387 |
| 4,838,946 A | 6/1989 | Yamaguchi et al. ........ 134/7 |
| 4,847,160 A | 7/1989 | Munz et al. ........ 428/447 |
| 4,946,903 A | 8/1990 | Gardella, Jr. et al. .... 525/326.4 |
| 4,983,459 A | 1/1991 | Franz et al. ........ 428/410 |
| 4,997,684 A | 3/1991 | Franz et al. ........ 427/384 |
| 5,071,709 A | 12/1991 | Berquier et al. ........ 428/447 |
| 5,234,718 A | 8/1993 | Mino et al. ........ 427/352 |
| 5,294,252 A | 3/1994 | Gun ........ 106/287.13 |
| 5,300,239 A | 4/1994 | Ozaki et al. ........ 252/86 |
| 5,308,705 A | 5/1994 | Franz et al. ........ 428/421 |
| 5,320,875 A | 6/1994 | Hu et al. ........ 427/493 |
| 5,328,768 A | 7/1994 | Goodwin ........ 428/428 |
| 5,372,851 A | 12/1994 | Ogawa et al. |
| 5,380,585 A | 1/1995 | Ogawa et al. ........ 428/333 |
| 5,383,354 A | * 1/1995 | Doris et al. ........ 73/105 |
| 5,389,427 A | 2/1995 | Berquier ........ 428/210 |
| 5,413,865 A | 5/1995 | Nakamura et al. ........ 428/432 |
| 5,415,927 A | 5/1995 | Hirayama et al. ........ 428/307.3 |
| 5,435,839 A | 7/1995 | Ogawa |
| 5,437,894 A | 8/1995 | Ogawa et al. ........ 427/535 |
| 5,463,010 A | 10/1995 | Hu et al. ........ 528/25 |
| 5,473,037 A | 12/1995 | Itoh et al. ........ 528/12 |
| 5,476,717 A | 12/1995 | Floch ........ 428/421 |
| 5,492,762 A | * 2/1996 | Hirai et al. ........ 428/447 |
| 5,525,660 A | 6/1996 | Shiono et al. ........ 524/268 |
| 5,543,171 A | 8/1996 | Shores ........ 427/177 |
| 5,580,605 A | 12/1996 | Ogawa et al. |
| 5,580,606 A | 12/1996 | Kai ........ 427/164 |
| 5,583,896 A | 12/1996 | Kondo et al. ........ 428/429 |
| 5,584,917 A | 12/1996 | Kijima et al. ........ 106/2 |
| 5,596,061 A | 1/1997 | Berger et al. ........ 528/26 |
| 5,599,625 A | 2/1997 | Wirth et al. ........ 428/391 |
| 5,599,893 A | 2/1997 | Asai et al. ........ 528/12 |
| 5,635,246 A | 6/1997 | Ogawa et al. ........ 427/341 |

(List continued on next page.)

FOREIGN PATENT DOCUMENTS

| | | | |
|---|---|---|---|
| DE | 3144457 A1 | 6/1982 | ........ C03C/17/30 |
| EP | 0 116 140 | 8/1987 | ........ C03C/25/02 |
| EP | 0 401 736 | 12/1990 | ........ C03C/17/30 |
| EP | 0 507 727 B1 | 10/1992 | ........ C07F/7/18 |
| EP | 0 783 464 B1 | 7/1997 | ........ C03C/17/30 |
| EP | 0 825 157 A2 | 2/1998 | ........ C03C/17/30 |
| WO | WO 98/45216 | 10/1998 | ........ C03C/17/30 |
| WO | WO 98/45217 | 10/1998 | ........ C03C/17/34 |

*Primary Examiner*—Jeffrey B Robertson
(74) *Attorney, Agent, or Firm*—Nixon & Vanderhye P.C.

(57) ABSTRACT

Substrates have a hydrophobic surface coating comprised of the reaction products of a chlorosilyl group containing compound and an alkylsilane. Most preferably the substrate is glass. In one preferred form of the invention, highly durable hydrophobic coatings may be formed by forming a silicon oxide anchor layer or hybrid organo-silicon oxide anchor layer from a humidified reaction product of silicon tetrachloride or trichloromethylsilane, followed by the vapor-deposition of a chloroalkylsilane. Such a silicon oxide anchor layer will advantageously have a root mean square surface roughness of less than about 6.0 nm (preferably less than about 5.0 nm) and a low haze value of less than about 3.0% (preferably less than about 2.0%). Another embodiment of the present invention include the simultaneous humidified vapor deposition of a chlorosilyl group containing compound and a chloroalkylsilane. Specifically, in certain preferred embodiments, the simultaneous vapor deposition onto a glass substrate of silicon tetrachloride ($SiCl_4$) and dimethyldichlorosilane (DMDCS) results in a hydrophobic coating comprised of cross-linked polydimethylsiloxane (PDMSO), which may then be capped with a fluoroalkylsilane (FAS). The cross-linked PDMSO layer may be formed on the surface of the glass substrate, or a silicon oxide anchor layer may be deposited under the cross-linked (PDMSO) layer. $SiCl_4$, trimethylchlorosilane (TMCS), trichloromethylsilane and combinations of these silanes therein may also be simultaneously vapor deposited onto a substrate surface so as to achieve hydrophobic coatings of exceptional durability.

35 Claims, 4 Drawing Sheets

U.S. PATENT DOCUMENTS

| | | |
|---|---|---|
| 5,665,424 A | 9/1997 | Sherman |
| 5,688,864 A | 11/1997 | Goodwin .................... 524/858 |
| 5,691,011 A * | 11/1997 | Newsham et al. ......... 428/1.31 |
| 5,693,236 A | 12/1997 | Okumura et al. ............. 2165/7 |
| 5,723,172 A | 3/1998 | Sherman |
| 5,763,091 A * | 6/1998 | Kawata et al. .............. 428/428 |
| 5,800,916 A | 9/1998 | Yoshino et al. ............. 428/328 |
| 5,837,644 A | 11/1998 | Nakanishi et al. .......... 502/416 |
| 5,840,252 A | 11/1998 | Ogawa et al. .............. 427/377 |
| 5,841,931 A * | 11/1998 | Foresi et al. ................. 385/131 |
| 5,846,279 A | 12/1998 | Nomura et al. .............. 65/30.1 |
| 5,851,674 A | 12/1998 | Pellerite et al. ............. 428/421 |
| 5,873,931 A | 2/1999 | Scholz et al. ................. 106/13 |
| 5,919,296 A | 7/1999 | Be et al. ................ 106/287.14 |
| 5,973,055 A | 10/1999 | Michaud et al. ............ 524/462 |
| 6,136,444 A * | 10/2000 | Kon et al. ............... 428/423.1 |
| 6,245,387 B1 | 6/2001 | Hayden |
| 2002/0001676 A1 | 1/2002 | Hayden ...................... 427/299 |

\* cited by examiner

Figure 1
R= Hydroxyl-containing surface, e.g. soda-lime glass

HIGHLY DURABLE HYDROPHOBIC COATINGS AND METHODS

This application claims the benefit of Provisional Application No. 60/236,335, filed Sep. 29, 2000.

FIELD OF THE INVENTION

The present invention relates generally to coated substrates and methods of coating the same. In preferred embodiments, the present invention relates to transparent substrates having a hydrophobic (water repellant) coating thereon.

BACKGROUND AND SUMMARY OF THE INVENTION

Glass is typically made of silicates that are melted to form a clear, transparent, solid material. The fundamental molecular structural unit of conventional glass is a $SiO_4$ tetrahedron. Ordinary float glass (named for its production process whereby a molten ribbon of glass is floated on molten metal to provide a smooth surface) includes additional amounts of soda ($Na_2O$), usually in the form of sodium carbonate or nitrate during the production process, lime (CaO) and other oxides (usually aluminum and magnesium oxides) to form a soda-lime-silica structure known colloquially as soda-lime glass. Other specialized glass can be prepared by the introduction of other additives and constituents.

It is sometimes highly desirable for conventional glass to have hydrophobic (water repellant) surface properties when employed in certain end-use applications, such as for automotive window glass. Various proposals exist to impart hydrophobic (water-repellant) properties to glass substrates. For example, U.S. Pat. Nos. 4,263,350, 4,274,856, 5,665,424 and 5,723,172 (the entire content of each being incorporated expressly hereinto by reference) disclose generally that glass surfaces can be coated with a vapor deposited layer of an chloroalkylsilane, such as dimethyldichlorosilane (DMDCS) so as to improve their hydrophobicity and/or release properties. Other proposals exist whereby a fluorinated alkylchlorosilane (FAS) coating may be employed to "cap" an underlayer on a glass substrate so as to improve coating durability. Please see in this regard, U.S. Pat. Nos. 5,328,768, 5,372,851, 5,380,585 and 5,580,605 (the entire content of each being incorporated expressly hereinto by reference). In addition, International Application WO 00/25938 (the entire content of which is expressly incorporated hereinto by reference) discloses that a silicon film consisting of chains of siloxane groups each terminating in an end molecule which reacts with water to form an OH group, may be capped by further reaction of that OH group with trimethylchlorosilane to form trimethylsiloxane chain ends.

While various hydrophobic coatings are known, there is still a need to provide such coatings with improved durability. It is towards fulfilling such a need that the present invention is directed.

Broadly, the present invention is embodied in substrates which exhibit improved hydrophobicity and durability. Most preferably, the substrate is glass. In some of the especially preferred embodiments of the present invention, coated substrates and methods are provided which include an $SiO_x$-containing anchor layer comprised of a controllably humidified vapor phase deposition of a chlorosilyl group containing compound (most preferably silicon tetrachloride), and a hydrophobic capping layer chemically bonded to the $SiO_x$-containing anchor layer.

In other especially preferred embodiments of the invention, highly durable hydrophobic coatings may be formed by the simultaneous aqueous vapor phase deposition of a chlorosilyl group containing compound and a chloroalkylsilane to form an anchor layer which may then be capped with a hydrophobic coating. For example, the simultaneous vapor deposition onto a glass substrate of silicon tetrachloride and dimethyldichlorosilane results in a hydrophobic coating comprised of polysiloxane chains crosslinked with silicon oxide branch points, derived from silicon tetrachloride (i.e. an insoluble reaction product), which may then be capped with a fluoro or chloroalkylsilane. Optionally, a silicon oxide ($SiO_x$) layer may be vapor deposited prior to, and thereby disposed under, the crosslinked polysiloxane in the manner noted above.

In other embodiments of the invention, coated substrates on glass may be produced comprising a first anchor layer comprised of a controllably humidified vapor phase deposition of a hybrid organo-chlorosilane group containing compound, most preferably methyltrichlorosilane (MTCS). In other embodiments, various other combinations of hydrophobic and oleofillic capping layers may be chemically bonded to the hybrid layer.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE INVENTION

Virtually any substrate that is self-supporting and has, or may be induced to have active surface hydrogen atoms may be coated in accordance with the present invention. Thus, rigid or flexible substrates formed of glass, plastics, ceramics, and the like may be coated in accordance with the present invention. Most preferably, the substrate is glass, with conventional soda-lime float glass being especially preferred.

In one particularly preferred coating in accordance with the present invention, an anchor layer comprised of a silicon oxide ($SiO_x$) is formed by vapor-deposition of a silicon-oxide forming compound onto the substrate in a controllably humidified environment. In especially preferred forms of the invention, the silicon oxide layer may be obtained by the reaction of a compound having a chlorosilyl group, such as silicon tetrachloride ($SiCl_4$). In other forms of the invention, the anchor layer may be obtained by the humidified reaction of an organo-chlorosilyl group to yield a hybrid organo-silicon oxide layer. The organo-chlorosilyl group may be a trichloroalkyl- or trichloroaryl silane such at methyltrichlorosilane (MTCS) or trichlorophenylsilane (TCPS). The compounds are reacted with the surface of the glass so as to form an underlayer containing $SiO_x$ or hybrid $SiO_xR_y$ groups where R is an organic group having six or less carbon atoms. Other silanes that form silicon oxide, or oxidic-like materials, may optionally, or additionally, be employed. For example, compounds such as hexachlorodisiloxane, trichloroalkylsilane wherein the alkyl group comprises one to six carbons and may be linear, cyclic, or branched or an aromatic group of up to six carbons can be employed. When using silicon tetrachloride, it has been found that diluting 1 part the silicon tetrachloride with 10 parts pentane is particularly effective in preparing useful coatings.

Figure 1:
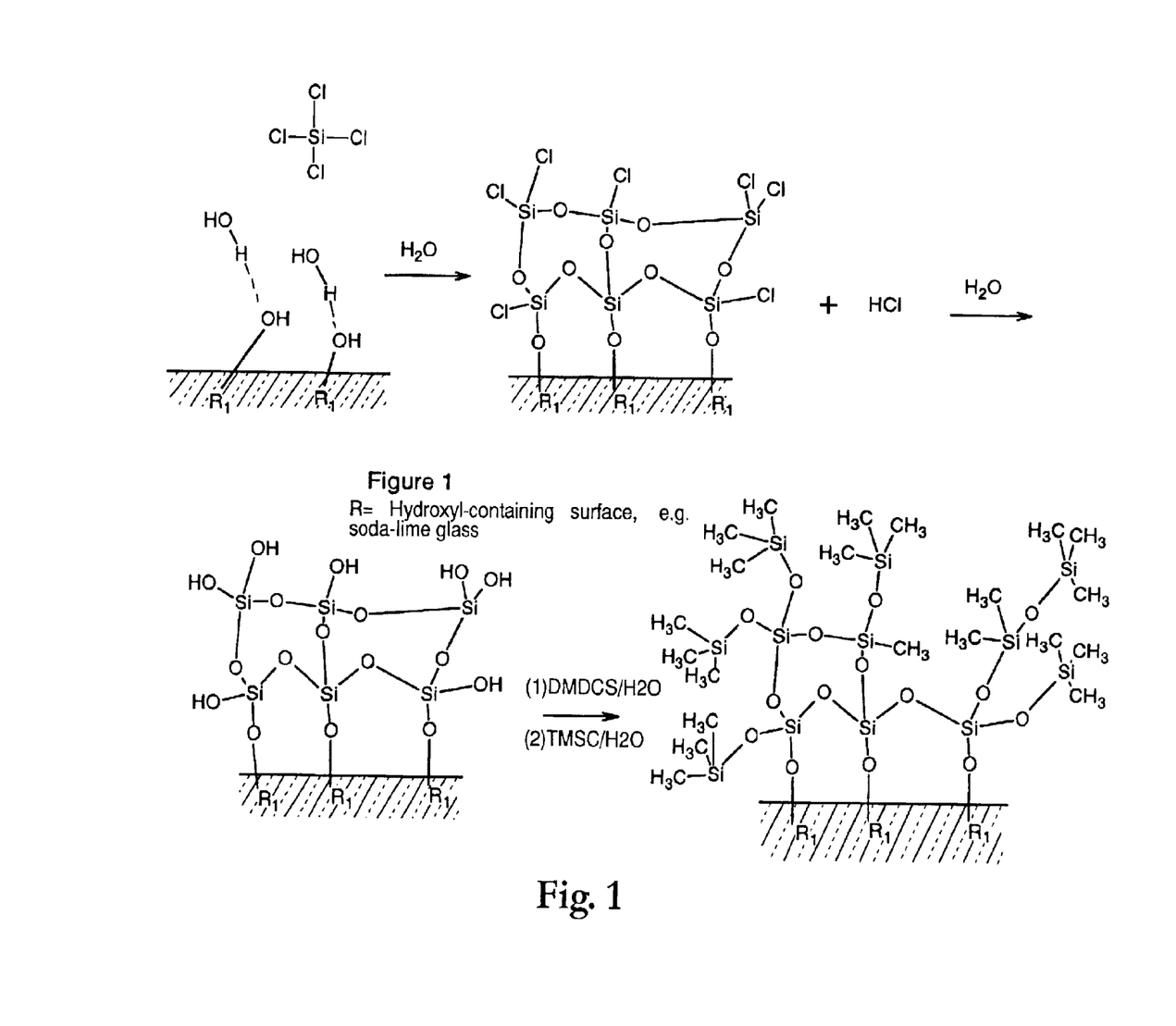
FIG. 1 is a schematic depiction of a technique to form a hydrophobic coating on a substrate in accordance with one embodiment of the present invention.

Accompanying FIG. 1 depicts schematically a particularly preferred technique for forming a hydrophobic coating in accordance with the present invention. In this regard, in one hydrophobic coating preparation, vapor-phase silicon tetrachloride is introduced into a closed chamber having a controlled interior humidity environment which results in silicon oxide units attaching directly to the glass substrate surface. Rehydrating the chlorine-terminated silicon oxide units (e.g., by controlling the humidity in the reaction chamber) results in replacing terminal chlorine atoms with hydroxyl groups so that, upon the additional sequential introduction of vapor-phase chloroalkylsilanes such as dimethyldichlorosilane (DMDCS), trimethylchlorosilane (TMCS), and methyltrichlorosilane (MTCS), and the like, with intermediate rehumidification of the chamber, durable hydrophobic coatings of polydimethylsiloxane (PDMSO), or other polysiloxane are obtained. Preferred silanes that may be used in accordance with the present invention are represented by the formula $Cl_xSiR_y$, where x is at least 14, and y is at least 1, R is an alkyl or aryl group which may also be a oleophillic group, e.g. a fluorinated alkyl.

The humidity during vapor-phase deposition of the silicon oxide anchor layer is important to achieve the desired end result of a durable hydrophobic coating on the substrate. In addition, controlled humidity during vapor phase deposition of the silicon oxide layer is important to achieve a coating with low haze characteristics. Thus, as generally illustrated in accompanying FIG. 2, the humidity during vapor phase deposition of the silicon oxide anchor layer from silicon tetrachloride should be less than about 50% relative humidity, and advantageously less than about 45% relative. Preferably the relative humidity within the chamber is controlled to be about 40% or less. Thus, the silicon oxide or hybrid organo-silicon oxide layer will most preferably exhibit haze (non-specular light scattering) of less than about 3.0%, and typically less than about 2.0%. Advantageously, the haze of the silicon oxide layer will be less than about 1.5%, particularly less than about 0.8%.

The lower limit of relative humidity, and hence haze value, of the silicon oxide anchor layer is believed to be determined by the surface roughness that is desired. In this regard, it has been found that the greater the humidity, the greater the surface roughness of the resulting silicon oxide anchor layer and vice versa. Without wishing to be bound to any particular theory, it is believed that the surface roughness of the silicon oxide layer contributes materially to the durability of the hydrophobic coatings obtained according to the invention as the peaks and valleys of the "rough" anchor layer provides physical pockets of various sizes and shapes where the later applied chloroalkylsilane can be deposited. In addition, a "rough" anchor layer of silicon oxide or hybrid organo-silicon oxide may provide an increased surface area resulting in the chloroalkylsilane being more dense per unit area on the substrate thereby possibly improving durability properties of the resulting coating.

In accordance with the present invention, therefore, it has been found that the silicon oxide or hybrid organo-silicon oxide anchor layer preferably has a root mean square (RMS) surface roughness of less than about 6.0 nm, and preferably less than about 5.0 nm. The RMS surface roughness of the silicon oxide layer preferably, however, is greater than about 4.0 nm. Therefore, the RMS surface roughness of the silicon oxide layer is advantageously between about 4.0 nm to about 6.0 nm, and more preferably between about 4.0 nm to about 5.0 nm. Too great a RMS surface area is disadvantageous since relatively large surface peaks, widely spaced apart, begin to diminish the desirable increased surface area. On the other hand, too small a RMS surface results in the surface being too smooth, that is to say an insufficient increase in the surface area and/or insufficient depth of the surface peaks and valleys on the surface.

As used herein and in the accompanying claims, the "root mean surface area", and "RMS surface area" and like terms are meant to refer to a measure of surface deviation from a flat, smooth surface as determined by atomic force microscope (AFM).

The PDMSO layer may optionally be overcoated (or capped) with an alkyl silane capping layer. In this regard, virtually any suitable alkyl silane may be employed to form a capping layer in accordance with the present invention, such as those described in the above-cited U.S. Pat. Nos. 5,328,768, 5,372,851, 5,380,585 and 5,580,605. For example, the capping layer may be formed by the vapor phase deposition of at least one fluoroalkylchlorosilane selected from the group consisting of $CF_3(CF_2)_5(CH_2)_2SiCl(CH_3)_2$, and $(CF_3)_2FC-O(CH_2)_3SiCl_2CH_3$.

Another particularly preferred embodiment of the present invention involves the simultaneous vapor deposition of a compound containing a chlorosilyl group and an alkylchlorosilane compound, to achieve essentially cross-linked PMDSO. This cross-linked PMDSO layer may be formed directly on the surface of the substrate, or may be formed on a previously applied silicon oxide or hybrid organo-silicon oxide anchor layer as described previously. The cross-linked PMDSO layer is most preferably capped with one or more layers formed by the individual vapor-deposition of alkylchlorosilanes and/or alkylchlorofluorosilane (i.e. "alkylfluorosilane") compounds. For example, especially desirable hydrophobicity and durability properties have been achieved by the simultaneous vapor deposition of silicon tetrachloride and DMDCS to obtain an underlayer on the substrate, which is thereafter capped with a layer of an alkylfluorosilane compound. Most preferably, the volume ratio of the simultaneously vapor-deposited chlorosilyl compound and the alkylchlorosilane compound will be between about 1:1 to about 1:30, and more preferably between about 1:5 to about 1:15. An especially preferred ratio (particularly when simultaneously vapor-depositing silicon tetrachloride and DMDCS) is about 1:10.

According to another specific embodiment in accordance with the present invention, silicon tetrachloride ($SiCl_4$) and trimethylchlorosilane (TMCS) or methyltrichlorosilane (MTCS) are simultaneously vapor deposited onto a glass surface to achieve a useful hydrophobic coating. Most preferably the $SiCl_4$ and TMCS are vapor deposited as a mixture having a ratio of $SiCl_4$ to TMCS within the range of between about 4.0:0.5 to about 4.0:1.5, and more preferably about 4.0:1.0 (for example, between about 4.0:0.9 to about 4.0:1.1). As briefly noted above, alkylchlorosilanes other than TMCS may be employed in admixture with $SiCl_4$, for example, dimethyldichlorosilane and methyltrichlorosilane. In addition, layers formed by the simultaneous vapor deposition of $SiCl_4$ and an alkylchlorosilane may be capped, if desired, in a manner described above with an alkylchlorosilane. In this regard, when $SiCl_4$ and TMCS are simultaneously vapor deposited, a suitable capping layer may be a vapor deposited layer of triethylchlorosilane (TECS) (i.e., so as to form a cap layer comprised of triethyl silane).

Figure 2:
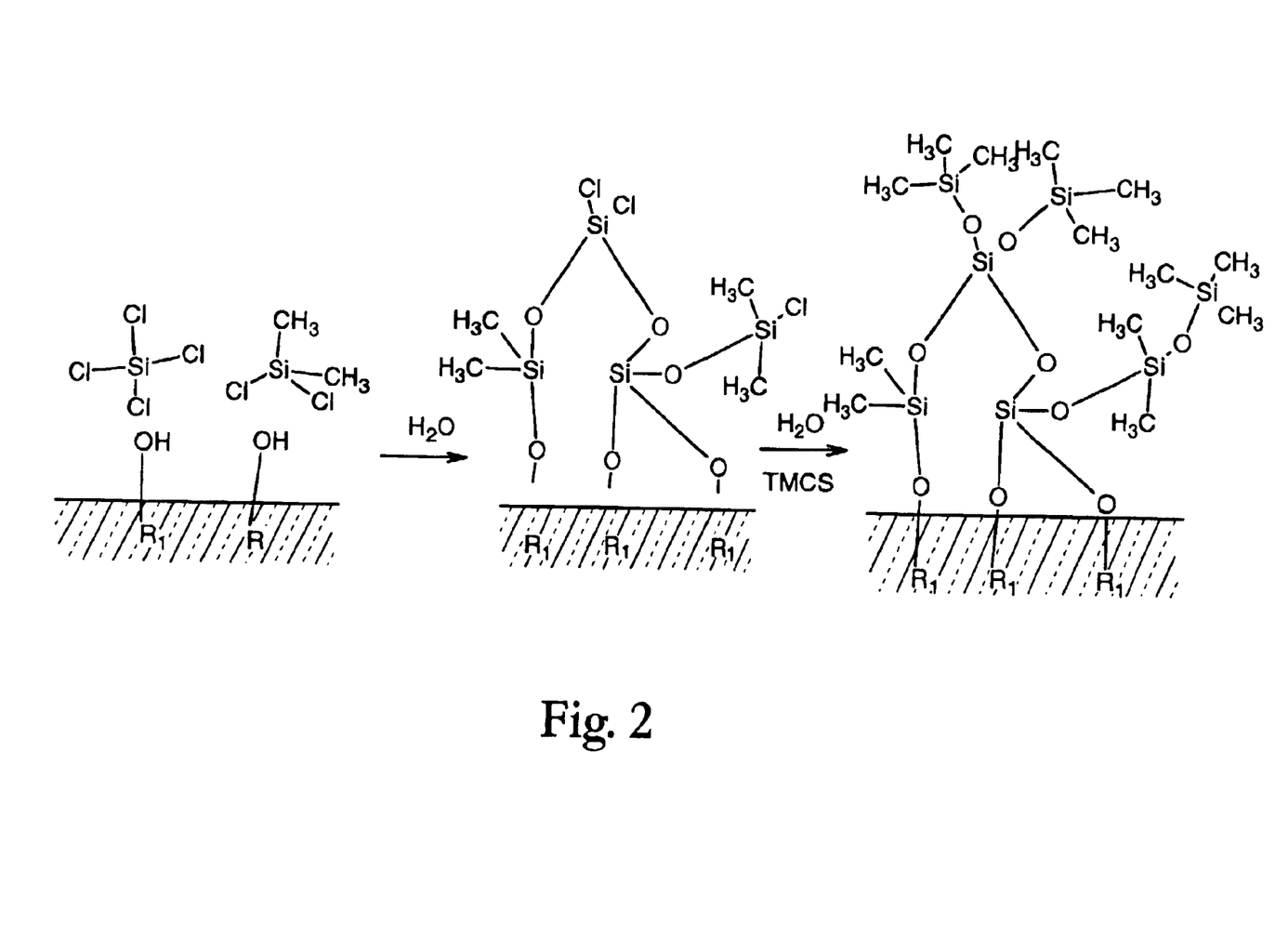
FIG. 2 is a schematic depiction of a technique to form a hydrophobic coating on a substrate in accordance with another embodiment of the present invention.
Figure 3:
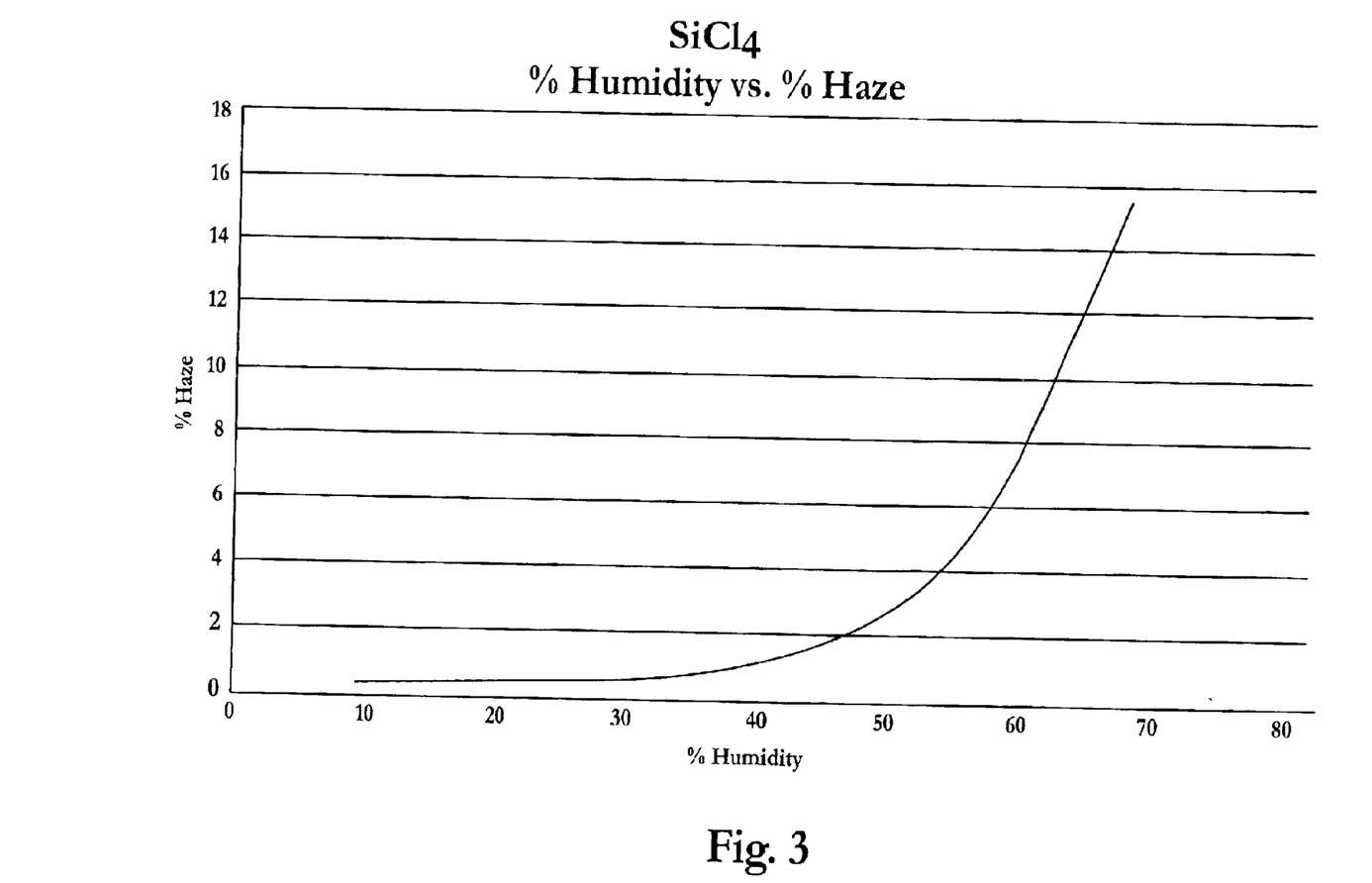
FIG. 3 is a graph of % Haze vs. % Humidity of a substrate coated with a silicon oxide ($SiO_x$) layer.

Accompanying FIG. 2 shows schematically one preferred technique for forming a cross-linked PMDSO layer in accordance with the present invention. In this regard, silicon tetrachloride and DMDCS are vapor-deposited simultaneously in a closed humidity-controlled chamber to form a cross-linked PMDSO layer on the glass substrate. Thereafter, the chamber may be rehumidified and supplied with a vapor of TMCS which serves to cap the cross-linked PMDSO layer.

Figure 4A:
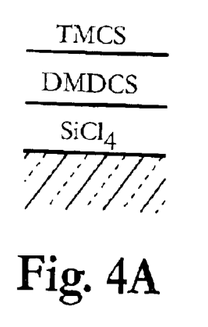
FIGS. 4A–4F schematically depict some exemplary coated glass substrates that may be made in accordance with the present invention.
Figure 4B:
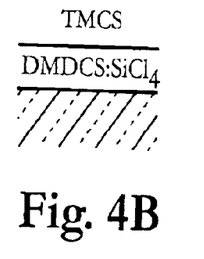
Figure 4C:
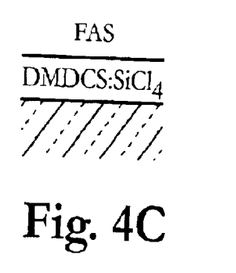
Figure 4D:
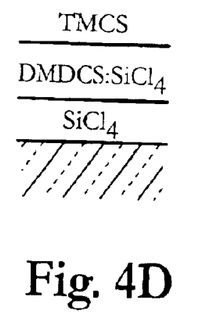
Figure 4E:
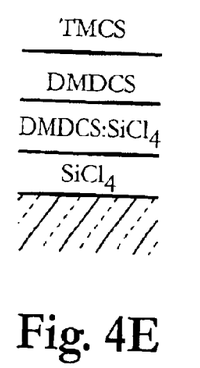
Figure 4F:
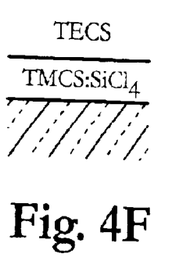

FIGS. 4A–4F depict a few exemplary coated glass substrates that may be made in accordance with the present invention. In this regard, for ease of understanding, each of the layers depicted in FIGS. 4A–4F refer to the precursor vapors, and not to the reaction products of such vapors. It will also be understood that, before another compound is vapor-deposited, the chamber is rehumidified as may be needed. Thus, for example, as viewed outwardly from the surface of the glass substrate, accompanying FIG. 4A shows a vapor-deposited layer of silicon tetrachloride as an anchor layer, followed by sequential vapor-deposited layers of DMDCS and TMCS. FIG. 4B depicts an underlayer comprised of simultaneously vapor-deposited silicon tetrachloride and DMDCS, followed by a separately vapor-deposited TMCS layer. FIG. 4C is similar to the coating of FIG. 4B, but includes a capping layer of a fluoroalkylchlorosilane (FAS). FIG. 4D is similar to FIG. 4A, but includes a layer of simultaneously vapor-deposited silicon tetrachloride and DMDCS interposed between the vapor-deposited silicon tetrachloride anchor layer and the vapor-deposited TMCS layer. FIG. 4E is similar to FIG. 4D, but includes sequentially vapor-deposited layers of DMDCS and TMCS over the simultaneously vapor-deposited layer of silicon tetrachloride and DMDCS. FIG. 4F is similar to FIG. 4D but includes a hydrophobic layer formed by the simultaneous vapor deposition of silicon tetrachloride and TMCS. An optional capping layer is also shown in FIG. 4F as being a vapor deposited layer of triethylchlorosilane (TECS), but may such a capping layer may be omitted if desired.

In other preferred embodiments, the substrate can have a first hydrophobic surface coating of a vapor deposited hybrid organo-silicon material which will produce a hydrophobic surface of a hybrid organo-silicon oxide layer such as that derived from trichloromethyl silane. In still other preferred embodiments having a hybrid first hydrophobic surface coating, additional vapor deposited layers of silicon tetrachloride, dimethyidichlorosilane and chlorotrimethylsilane or their mixtures may be used. When mixtures of these materials are used to prepare vapor deposited surface coatings the ratios of the various components can be varied. For example, the ratios of binary and ternary mixtures of silanes may range from equimolar amounts added to the reactor to fractions of each, depending on the properties desired.

The thickness of the various layers obtained according to the present invention are not especially critical, provided the desired hydrophobicity and/or durability properties are achieved. Thus, layer thickness in the range of between about 10 to about 10,000 Angstroms, and typically between about 20 to about 5000 Angstroms may be provided.

The coated substrates of the present invention will exhibit a tilt angle (30 µL droplet size) of about 35° or less, and typically 30° or less. For some embodiments of the present invention, extremely low tilt angles of about 20° or less, or even about 10° or less, are obtainable. The coatings of the present invention are also highly durable. That is, the coated substrates of the present invention will exhibit a contact angle after 300 Taber abrasion cycles of greater than about 65°, and typically greater than about 70°. Even after 1000 Taber cycles, the coated substrates of the present invention will exhibit a contact angle of greater than about 60°, usually between (or from) about 65° to about 75°.

The coated substrates of the present invention can be conveniently produced using a closed reaction chamber configured to have an inlet opening for the chemical vapors, and a discharge opening to allow the chamber to be exhausted. The substrates are cleaned thoroughly and rinsed prior to being placed in the reaction chamber. The humidity within the chamber is controlled by the introduction of water vapor in dependence upon the chemical vapors being deposited. Thus, humidity within the reaction chamber of greater than about 10%, and less than about 80% are typically employed. The reaction chamber is most preferably maintained under ambient temperature (20° C.–25° C.) and atmospheric pressure (about 1.0 atmosphere) conditions during the vapor deposition of the underlayer and capping layer(s).

The present invention will be further understood by reference to the following non-limiting Examples.

EXAMPLES

Substrates used for evaluation in the following examples were clear annealed 3 mm float glass. Only coating applied to the air side of the substrate was evaluated. The substrates were coated in a polypropylene reaction chamber having the dimensions of approximately 16" L×14" W×8" D. The chamber included a glass lid to allow for visual process observations. Dry air, humid air, or dry air saturated with coating precursor vapor was introduced at one end of the chamber, and exhausted at the other.

The glass substrates were cleaned and then placed into the reaction chamber, aligned parallel to the gas flow. Humid air was produced by bubbling air through water kept at a substantially constant temperature of 40° C. The humidity level in the chamber was maintained substantially constant by admixing dry air. Reaction precursors were introduced in a similar manner, that is, by flowing dry air over the precursor liquid and into the chamber. After each process step was completed, unreacted vapors were exhausted from reaction chamber for a minimum of 5 minutes prior to removal of the coated substrates.

Some of the substrates evaluated were additionally surface treated, by applying liquid chlorofluoroalkylsilane (FAS) onto the surface. The FAS compounds were identified as FAS(A) having the formula $CF_3(CF_2)_5(CH_2)2SiCl(CH_3)_2$ and FAS(B) having the formula $(CF_3)_2FC-O(CH_2)_3SiCl_2CH_3$.

Unreacted material was removed by cleaning the surface with n-butanol, followed by hand buffing with a clean cloth or paper towel.

The substrates were evaluated using the following test methods and techniques:

Contact Angle: Advancing contact angle was measured at various locations on the coated substrate. The recorded value represented the average value of all measured readings.

Abrasion Resistance: The abrasion resistance was evaluated on the basis of contact angle change at the abrasion location. The coating was Taber-abraded using CS-10F wheels and 500 g load. The CF-10F wheels were resurfaced prior to each abrasion test (25 cycles with resurfacing stone). After 300 cycles, the substrate was removed from abrader and cleaned. The Taber track was cleaned by immersing the substrate in warm distilled water (40–45C.) for 5–10 seconds. The Taber track was wiped with clean Preference brand paper towels. The substrate was thereafter rinsed with room temperature distilled water. The surface to be tested was dried with compressed air. After the contact angle measurement, the substrate was abraded for an additional 700 cycles. The substrates were cleaned as before and the contact angle was again measured.

Tilt Angle: The coated substrate was placed on an instrument that was able to tilt and record the angle of such tilt. A 30 micro liter drop of distilled water was gently placed on the surface to be tested at an initial tilt angle of 0 degrees. The angle at which the surface was tilted was increased periodically at 1° increments until the drop of water flowed across the surface. The angle of the surface at that time was then recorded as the tilt angle.

Example I (Comparative)

A glass substrate was cleaned using the following procedure: The substrate was first rinsed off with tap water. BON AMI™ cleaner was placed on a wet sponge and the surface was cleaned with the sponge using approximately 3 to 5 pounds of pressure, following which the substrate was again rinsed with tap water. LIQUINOX™ soap which had been reduced one part soap to 100 parts distilled water was applied to wet surface. The surface was cleaned with the soap and a soft brush also at 3 to 5 pounds of pressure. After an appropriate amount of cleaning, the surface was rinsed first with tap water and then with distilled water. The wetting of the substrate surface after cleaning was used to determine the cleanliness of the glass surface. The substrate was placed into a carrier and blown dry using dried compressed air.

The cleaned substrate was then placed into the reaction chamber parallel to the gas flow. The reaction chamber humidity was adjusted to 78%, and then held at that humidity for 5 minutes. After a stabilization period of 30 seconds, dimethyidichlorosilane (DMDCS) was introduced into reaction chamber for an additional 5 minutes. After an additional 30-second stabilization period, the gases were exhausted from the chamber for 10 minutes, following which the substrate was removed from the chamber. Excess material was the removed with N-butanol and the surface was buffed with clean paper towel.

Example II (Comparative)

A glass substrate was cleaned per Example I. The substrate was placed into a carrier and blown dry using dried compress air. The cleaned substrate was placed into the reaction chamber parallel to the gas flow. Chamber humidity was adjusted to 78%, and then held at that elevated humidity for 5 minutes. After a stabilization period of 30 seconds, dimethyldichlorosilane (DMDCS) was introduced into the reaction chamber for an additional 5 minutes. The chamber was thereafter purged, and after a second stabilization period, the reaction chamber was adjusted to 81%. The humidity was held for 5 minutes and the substrate was then removed from the chamber. Immediately after removal from the chamber a thin layer of FAS (A) was applied by hand to the substrate over the excess silane using a paper towel. The substrate was allowed to stand for 30 to 90 seconds. The excess material was then removed with N-butanol, and the surface was buffed with a clean paper towel.

Example III (Comparative)

A glass substrate was cleaned per Example I. The substrate was placed into a carrier and blown dry using dried compress air. The cleaned substrate was placed into the reaction chamber parallel to the gas flow. Chamber humidity was adjusted to 14%, and then held at that humidity for 5 minutes. After a stabilization period of 30 seconds, silicon tetrachloride was introduced into the reaction chamber for an additional 5 minutes. The chamber was thereafter purged, and after a second stabilization period, the reaction chamber was adjusted to 80%. The humidity was held for 5 minutes, following which the substrate was removed from the chamber. Immediately after removal from chamber a thin layer of FAS (A) was applied by hand to the substrate over the excess silane using a paper towel. The substrate was allowed to stand for 30 to 90 seconds. The excess material was then removed with N-butanol, and the surface was buffed with clean paper towel.

Example IV (Invention)

A glass substrate was cleaned using the following procedure. WINDEX™ cleaner with ammonia was applied to the surface of both sides. The wet surface was scrubbed with paper towel. The substrate was then polished with a clean paper towel, removing all excess cleaner. The cleaned substrate was then placed into the reaction chamber parallel to the gas flow. The chamber humidity was adjusted to 14%, and then held there for 5 minutes. After a stabilization period of 30 seconds, silicon tetrachloride was introduced into the reaction chamber for an additional 5 minutes. The chamber was thereafter purged, and after a second stabilization period, the reaction chamber was rehumidified to 38%. After yet another 30-second stabilization period, dimethyldichlorosilane (DMDCS) was added to chamber for a total of 5 minutes. After a final 30-second stabilization period, the gases were exhausted from the chamber for 10 minutes, following which the substrate was removed therefrom. Excess material was then removed with N-butanol, and the surface was buffed with clean paper towel.

Example V (Invention)

A glass substrate was clean using the following procedure. The substrate was rinsed with tap water. LIQUINOX™ soap which had been reduced one part soap to 100 parts distilled water was applied to the wet surface and the surface cleaned with the soap and a soft brush at 3 to 5 pounds of pressure. After an appropriate amount of cleaning, the surface was rinsed first with tap water and then with distilled water. The wetting of the substrate surface after cleaning was used to determine the cleanliness of the glass surface. The substrate was placed into a carrier and blown dry using dried compress air. The cleaned substrate was placed into the reaction chamber parallel to the gas flow. Chamber humidity was adjusted to 14%, and then held at that humidity for 5 minutes. After a stabilization period of 30 seconds, a mixture of 5 parts dimethyldichlorosilane (DMDCS) and one part silicon tetrachloride was introduced into the reaction chamber for 5 minutes. After an additional 30-second stabilization period, the gases were exhausted from the chamber for 10 minutes, following which the substrate was removed from the chamber. FAS(B) was added and after 60–90 seconds, the glass substrate was cleaned with N-butanol.

Example VI (Invention)

A glass substrate was cleaned per Example I. The cleaned substrate was placed into the reaction chamber parallel to the gas flow. Chamber humidity was adjusted to 14%, and then held at that humidity for 5 minutes. After a stabilization period of 30 seconds, silicon tetrachloride was introduced into the reaction chamber for an additional 5 minutes. The chamber was thereafter purged, and after a second stabilization period, the reaction chamber was rehumidified to 14% and held for 5 minutes. After a 30-second stabilization period, a mixture of 5 parts dimethyldichlorosilane and one part silicon tetrachloride was introduced into reaction chamber for 5 minutes. The chamber was again purged and allowed to stabilize for 30 additional seconds, and the chamber humidity was adjusted to 77%. After 5 minutes at 77% humidity, the substrate was removed from the chamber. Immediately after removal from chamber, a thin layer of FAS (A) was applied by hand to the substrate over the excess silane using a paper towel. The substrate was allowed to stand for 30 to 90 seconds. The excess material was then removed with N-butanol, and the surface was buffed with clean paper towel.

Example VII (Invention)

A glass substrate was cleaned per Example I. The cleaned substrate was placed into the reaction chamber parallel to the gas flow. The chamber humidity was adjusted to 14%, and then held at that humidity for 5 minutes. After a stabilization period of 30 seconds, silicon tetrachloride was introduced into reaction chamber for an additional 5 minutes. The chamber was thereafter purged, and after a stabilization period of about 30 seconds, the reaction chamber was rehumidified to 14%. and held there for 5 minutes. After another 30-second stabilization period, a mixture of 5 parts dimethyldichlorosilane and one part silicon tetrachloride, was introduced into the reaction chamber for 5 minutes. The chamber was vented and rehumidified to 59% and held for 5 minutes, following which DMDCS vapor was introduced for 5 minutes. The chamber was thereafter vented and was again allowed to stabilize for 30 seconds, and the chamber humidity was adjusted to 77%. After 5 minutes at 77% humidity, the substrate was removed from the chamber. Immediately after removal from chamber, a thin layer of FAS(B) was applied by hand to the substrate over the excess silane using a paper towel. The substrate was allowed to stand for 30 to 90 seconds. The excess material was then removed with N-butanol, and the surface was buffed with clean paper towel.

The coated float glass substrates of Examples I through VII were examined for abrasion resistance and tilt angle. The data appears in Table A below.

TABLE A

| Example No. | Contact Angle After Taber Cycles | | | Tilt Angle (30 µl Drop) |
|---|---|---|---|---|
| | 0 | 300 | 1000 | |
| I | 101° | 56° | 43° | 26° |
| II | 117° | 52° | 43° | 33° |
| III | 106° | 50° | 45° | 24° |
| IV | 100° | 70° | 67° | 27° |
| V | 107° | 74° | 66° | 33° |
| VI | 108° | 74° | 67° | 19° |
| VII | 98° | 84° | 67° | 10° |

As can be seen from the data above, a comparison of Examples I and IV reveals that improved durability ensues with an initial vapor deposited silica layer following by a vapor deposited DMDCS top layer relative to a DMDCS layer only. Furthermore, the simultaneous vapor deposition of DMDCS $SiCl_4$ (leading to a crosslinked polydimethylsilxane PDMSO) underlayer) which is capped with a liquid applied FAS layer results in improved durability relative to a vapor deposited DMDCS layer only. (Compare, Examples V and I.) The data of Example VI and VII reveal that the simultaneous vapor deposition of DMDCS and $SiCl_4$ which is capped with liquid applied FAS results in surprisingly lower tilt angles.

Examples VIII and IX (Comparative)

Examples I and II were repeated, respectively, except that in Example IX, TMCS was employed instead of FAS(A) as a capping layer. The results of Taber abrasion and tilt angle testing appear in Table B below.

Example X (Invention)

A glass substrate was coated in a closed chamber into which vapor phase precursor compounds were introduced. Specifically, the following formulation was employed in the sequence noted below to obtain a coated glass substrate having the structure depicted in FIG. 4A. The chamber was allowed to stabilize for about 5 minutes following introduction of each vapor compound. In addition, the chamber was purged by vacuum before each new vapor was introduced so that the humidity within the chamber could be adjusted as noted.

(1) 20% RH, $SiCl_4$ in pentane
(2) 60% RH, DMDCS
(3) 60% RH, TMCS

The results of Taber abrasion and tilt angle testing appear in Table B below.

Example XI (Invention)

Example X was repeated using the following formulation sequence to achieve a coated glass substrate generally depicted in FIG. 4B:

(1) 40% RH, simultaneous DMDCS and $SiCl_4$
(2) 60% RH, TMCS

The results of Taber abrasion and tilt angle testing appear in Table B below.

Example XII (Invention)

Example XI was repeated except that FAS(A) was wiped on by hand instead of using vapor-deposited TMCS to achieve a coated glass substrate generally depicted in FIG. 4C. The results of Taber abrasion and tilt angle testing appear in Table B below.

Example XIII (Invention)

Example X was repeated using the following formulation sequence to achieve a coated glass substrate generally depicted in FIG. 4D:

(1) 20% RH, $SiCl_4$ in pentane
(2) 40% RH, simultaneous DMDCS and $SiCl_4$
(3) 60% RH, TMCS The results of Taber abrasion and tilt angle testing appear in Table B below.

Example XIV (Invention)

Example X was repeated using the following formulation sequence to achieve a coated glass substrate generally depicted in FIG. 4E:

(1) 20% RH, SiCl$_4$ in pentane (2) 40% RH, simultaneous DMDCS and SiCl$_4$ (3) 60% RH, DMDCS (4) 60% RH, TMCS The results of Taber abrasion and tilt angle testing appear in Table B below.

TABLE B

| Example No. | Contact Angle After Taber Cycles | | | Tilt Angle |
|---|---|---|---|---|
| | 0 | 300 | 1000 | (30 µl Drop) |
| VIII | 115° | 54° | 46° | 38° |
| IX | 118° | 61° | 55° | 28° |
| X | 106° | 91° | 74° | 10° |
| XI | 117° | 71° | 68° | 29° |
| XII | 118° | 70° | 69° | 10° |
| XIII | 120° | 71° | 74° | 40° |
| XIV | 107° | 86° | 75° | 12° |

The data in Table B also reveal that improved hydrophobicity and durability ensue with the coatings in accordance with the present invention.

Example XV (Invention)

Green automotive window glass comprised of a layer of 0.76 mm thick PVB film laminated between a pair of 2.1 mm thick glass layers was coated in the same manner as Example X using 20% RH in the chamber and a mixture of SiCl$_4$ and TMCS at a ratio of 4:1, respectively, using pentane as a carrier. Specifically, a mixture of 100 ml pentane, 5 ml SiCl$_4$ and 1.25 ml TMCS were employed for purpose of vapor deposition onto a top layer of the automotive glass laminate. The resulting coated glass substrate was found to have optical characteristics of about 79.9% Transmission and about 0.24% Haze, and color characteristics of L*=90.8, a*=−6.8 and b*=1.6. The coated glass substrate was subjected to Taber wear and tilt angle tests with the results being reported below in Table C.

TABLE C

| Contact Angle After Taber Cycles | | | | | | Tilt Angle | |
|---|---|---|---|---|---|---|---|
| 0 | 300 | 1000 | 2000 | 3000 | 4000 | (10 µl Drop) | (30 µl Drop) |
| 88.8° | 78.1° | 70.1° | 68.5° | 67.0° | 64.5° | 40° | 38° |

As the data in Table C demonstrate, the coating is optically satisfactory and exhibits extremely durable hydrophobicity (as evidenced by the contact angle data after many thousands of Table cycles).

Example XVI (Invention)

Green auto glass was prepared as in Example XV(Invention) with an additional layer of a vapor deposited mixture of DMDCS and SiCl$_4$ and sequentially added layers of DMDCS and TMCS respectively. The Contact Angles After Taber Cycles and Tilt Angle are listed in Table D, below.

TABLE D

| Contact Angle After Taber Cycles | | | | | | Tilt Angle | |
|---|---|---|---|---|---|---|---|
| 0 | 300 | 1000 | 2000 | 3000 | 4000 | (10 µl Drop) | (30 µl Drop) |
| 107° | 83.2° | 76.9° | 72.5° | 70.4° | 68.3° | 18° | 13° |

Example XVII (Invention)

A glass substrate is cleaned by first rinsing with tap water and LIQUINOX™ soap that is reduced to one part soap to 100 parts distilled water. The solution is applied to the wet substrate surface and cleaned with a soft brush using 3 to 5 pounds of pressure. The surface is rinsed first with tap water and then with distilled water. The substrate surface is deemed clean when distilled water rinses clear. The cleaned substrate is placed into a carrier and blown dry using dried compress air. The cleaned substrate is placed into the reaction chamber parallel to the gas flow. After a period to ensure stabilization of the humidity within the reaction chamber, about 30 seconds, silicon tetrachloride (SiCl$_4$) is introduced into the reaction chamber for about 5 minutes to generate a first layer of Silicon Oxide, SiO$_x$ layer having an RMS surface roughness of at least 4 nm and preferably less than about 6 nm. The chamber is subsequently purged, and rehumidified to at least about 14 percent. After a 30-second stabilization period, dimethyldichlorosilane (DMDCS-SiCl$_2$Me$_2$) and methyltrichlorosilane (MTCS) are added in equivolume (one part to one part) amounts to the chamber for a total of 5 minutes. The reaction chamber humidity is adjusted to about 14%, and then held at a relatively constant humidity for about 5 minutes to then generate a crosslinked layer. The initial advancing contact angle is greater than 60° and greater than 45° after 300 Taber Cycles.

Example XVIII (Invention)

A glass substrate is cleaned using the procedure in Example XVII. The cleaned substrate is placed into a carrier and blown dry using dried compress air. The cleaned substrate is placed into the reaction chamber parallel to the gas flow. After a period to ensure stabilization of the humidity within the reaction chamber, about 30 seconds, silicon tetrachloride (SiCl$_4$) is introduced into the reaction chamber for about 5 minutes to generate a first Silicon Oxide layer, SiO$_x$, having an RMS surface roughness of at least 4 nm and preferably less than about 6 nm. The chamber is purged, and rehumidified to at least about 14 percent. After a 30-second stabilization period, dimethyldichlorosilane (DMDCS-SiCl$_2$Me$_2$) and methyltrichlorosilane are added to the chamber for a total of 5 minutes in ratios of DMDCS to MTCS of about 9 parts to 1 parts. The reaction chamber humidity is adjusted to about 14%, and held at a relatively constant humidity for about 5 minutes to then generate a crosslinked layer. The reaction chamber is subsequently evacuated and the coated substrate is removed from the chamber. The initial advancing contact angle is greater than 70° and greater than 55° after 300 Taber Cycles.

Example XIX (Invention)

A glass substrate is cleaned using the procedure in Example XVII. The cleaned substrate is placed into a carrier and blown dry using dried compress air. The cleaned substrate is placed into the reaction chamber parallel to the gas flow. After a period to ensure stabilization of the humidity within the reaction chamber, about 30 seconds, silicon tetrachloride (SiCl$_4$) is introduced into the reaction chamber for about 5 minutes to generate a first layer of Silicon Oxide, SiO$_x$, having an RMS surface roughness of at least 4 nm and preferably less than about 6 nm. The chamber is subsequently purged, and rehumidified to at least about 14 percent. After a 30-second stabilization period, dimethyldichlorosilane (DMDCS- SiCl$_2$Me$_2$) and methyltrichlorosilane (MTCS-SiCl$_3$CH$_3$) are added to the chamber for a total of 5 minutes in ratios of DMDCS to MTCS of about 3 part to 1 parts by weight. The reaction chamber humidity is adjusted to about 14%, and then held at a relatively constant humidity for about 5 minutes to then generate a crosslinked layer. The reaction chamber is subsequently evacuated after a final coating is applied, and the coated substrate is removed from the chamber. The initial advancing contact angle is greater than 70° and greater than 55° after 300 Taber Cycles.

Example XX (Invention)

A glass substrate is cleaned using the procedure in Example XVII. The cleaned substrate is placed into a carrier and blown dry using dried compress air. The cleaned substrate is placed into the reaction chamber parallel to the gas flow. After a period to ensure stabilization of the humidity within the reaction chamber, about 30 seconds, silicon tetrachloride (SiCl$_4$) is introduced into the reaction chamber for about 5 minutes to generate a first layer of SiO$_x$ having an RMS surface roughness of at least 4 nm and preferably less than about 6 nm. The chamber is subsequently purged, and rehumidified to at least about 14 percent. After a 30-second stabilization period, dimethyldichlorosilane (DMDCS- SiCl5$_2$Me$_2$) and methyltrichlorosilane (MTCS-SiCl$_3$CH$_3$) are added to the chamber for a total of 5 minutes in ratios of DMDCS to MTCS of about 1 to 3 parts by weight. The reaction chamber humidity is adjusted to about 14%, and then held at a relatively constant humidity for about 5 minutes to then generate a crosslinked layer. After an additional stabilization period of at least 30 seconds, additional methyltrichlorosilane (DMDCS) is introduced into the reaction chamber for an additional five minutes to provide a final capping layer. The reaction chamber is subsequently evacuated after a final coating is applied, and the coated substrate is removed from the chamber. The initial advancing contact angle is greater than 105° and greater than 65° after 300 Taber Cycles.

Example XXI (Invention)

A glass substrate is cleaned using the procedure in Example XVII. The cleaned substrate is placed into the reaction chamber parallel to the gas flow. After a period to ensure the stabilization of the humidity within the reaction chamber, about 30 seconds, silicon tetrachloride (SiCl$_4$) is introduced into the reaction chamber for about 5 minutes to generate a first layer having an RMS surface roughness of at least 4 nm and preferably less than about 6 nm. The chamber is subsequently purged, and rehumidified to at least about 14 percent. After a 30-second stabilization period, dimethyldichlorosilane (DMDCS- SiCl$_2$Me$_2$) and methyltrichlorosilane (MTCS- SiCl$_3$CH$_3$), and Silicon Tetrachloride (SiCl4) are added in equimolar amounts to the chamber for a total of 5 minutes. The reaction chamber humidity is adjusted to about 14%, and then held at a relatively constant humidity for about 5 minutes. The reaction chamber is evacuated after a final coating is applied, following which the coated substrate is removed from the chamber. The initial advancing contact angle is greater than 60° and greater than 45° after 300 Taber Cycles.

Example XXII (Invention)

A glass substrate is cleaned using the procedure in Example XVII. The cleaned substrate is placed into the reaction chamber parallel to the gas flow. After a period to ensure the stabilization of the humidity within the reaction chamber, about 30 seconds, silicon tetrachioride (SiCl$_4$) is introduced into the reaction chamber for about 5 minutes to generate a first layer having an RMS surface roughness of at least 4 nm and preferably less than about 6 nm. The chamber is subsequently purged, and rehumidified to at least about 14 percent. After a 30-second stabilization period, dimethyldichlorosilane (DMDCS- SiCl$_2$Me$_2$) and methyltrichlorosilane (MTCS-SiCl$_3$CH$_3$), and Silicon Tetrachloride (SiCl4) are added in equimolar amounts to the chamber for a total of 5 minutes. The reaction chamber humidity is adjusted to about 14%, and then held at a relatively constant humidity for about 5 minutes. After an additional stabilization period of at least 30 seconds, to ensure humidity is correct and stable, additional methyltrichlorosilane is introduced into the reaction chamber for an additional five minutes to provide a capping layer. The reaction chamber is evacuated after a final coating is applied, following which the coated substrate is removed from the chamber. The initial advancing contact angle is greater than 60° and greater than 45° after 300 Taber Cycles.

Example XXIII (Invention)

A glass substrate is cleaned using the procedure in Example XVII. The substrate is placed into a carrier and blown dry using dried compress air. The cleaned substrate is placed into the reaction chamber parallel to the gas flow. After a period to ensure the stabilization of the humidity within the reaction chamber, about 30 seconds, silicon tetrachioride (SiCl$_4$) is introduced into the reaction chamber for about 5 minutes to generate a first layer having an RMS surface roughness of at least 4 nm and preferably less than about 6 nm. The chamber is subsequently purged, and rehumidified to at least about 14 percent. After a 30-second stabilization period, dimethyld ichiorosilane (DMDCS- SiCl$_2$Me$_2$) and methyltrichlorosilane (MTCS-SiCl$_3$CH$_3$), and Silicon Tetrachloride (SiCl$_4$) are added to the reaction chamber with the quantities of each reactant being a ratio of 1 parts DMDCS, 1 parts MTCS and 2 parts of SiCl$_4$ by weight added to the reaction chamber for a total of 5 minutes. The reaction chamber humidity is adjusted to about 14%, and held at a relatively constant humidity for about 5 minutes. After an additional stabilization period of at least 30 seconds to stabilize the humidity level methyltrichlorosilane is introduced into the reaction chamber for an additional five minutes to provide a capping layer. The reaction chamber is evacuated after the final coating is applied and the substrate is removed from the chamber. The initial advancing contact angle is greater than 60° and greater than 45° after 300 Taber Cycles.

Example XXIV (Invention)

A glass substrate is cleaned using the procedure in Example XVII. The substrate is placed into a carrier and is blown dry using dried compress air. The cleaned substrate is placed into the reaction chamber parallel to the gas flow. Chamber humidity is adjusted to 14%, and then held at that humidity for 5 minutes. After a stabilization period of 30 seconds, a mixture of 5 parts dimethyldichlorosilane (DMDCS) and one part trichloromethylsilane is introduced into the reaction chamber for 5 minutes. After an additional 30-second stabilization period, the gases are exhausted from the chamber for 10 minutes, following which the substrate is removed from the chamber. FAS (B) is added and after 60–90 seconds of treatment, the glass substrate is cleaned with N-butanol. The initial advancing contact angle is greater than 100° and greater than 65° after 300 Taber Cycles.

Example XXV (Invention)

A glass substrate is cleaned using the procedure in Example XVII. The substrate is placed into a carrier and is blown dry using dried compress air. The cleaned substrate is placed into the reaction chamber parallel to the gas flow. Chamber humidity is adjusted to 14%, and then held at that humidity for 5 minutes. After a stabilization period of 30 seconds, a trichloromethylsilane (TCMS) is introduced into the reaction chamber for 5 minutes to produce a surface layer having a surface roughness of from about 1 to 6 nm. RMS and a higher degree of hydrophobicity as measured by contact angle than a surface derived from purely $SiCl_4$. After an additional 30-second stabilization period, the gases are exhausted from the chamber for 10 minutes, following which the substrate is removed from the chamber. FAS (B) is added and after 60–90 seconds, the glass substrate is cleaned with N-butanol. The initial advancing contact angle is greater than 100° and greater than 65° after 300 Taber Cycles.

Example XXVI (Invention)

A glass substrate is cleaned using the procedure in Example XVII. The substrate is placed into a carrier and blown dry using dried compress air. The cleaned substrate is placed into the reaction chamber parallel to the gas flow. After a period to ensure stabilization of the humidity within the reaction chamber, about 30 seconds, trichloromethylsilane is introduced into the reaction chamber for about 5 minutes to generate a first layer of an $SiO_xMe_y$ layer having an RMS surface roughness of about 1 nm and preferably less than about 6 nm. The chamber is subsequently purged, and rehumidified to at least about 14 percent. After a 30-second stabilization period, dimethyldichlorosilane (DMDCS-$SiCl_2Me_2$) and methyltrichlorosilane (MTCS-$SiCl_3CH_3$) are added in equimolar amounts to the chamber for a total of 5 minutes. The reaction chamber humidity is adjusted to about 14%, and then held at a relatively constant humidity for about 5 minutes to then generate a crosslinked layer. Optionally, after an additional stabilization period of at least 30 seconds, methyltrichlorosilane (MTCS) is introduced into the reaction chamber for an additional five minutes to provide a capping layer. The reaction chamber is subsequently evacuated after a final coating is applied, and the coated substrate is removed from the chamber. The initial advancing contact angle is greater than 70° and greater than 50° after 300 Taber Cycles.

Example XXVII (Invention)

A glass substrate is cleaned using the procedure in Example XVII. The substrate is placed into a carrier and blown dry using dried compress air. The cleaned substrate is placed into the reaction chamber parallel to the gas flow. After a period to ensure stabilization of the humidity within the reaction chamber, about 30 seconds, trichloromethylsilane is introduced into the reaction chamber for about 5 minutes to generate a first layer of an $SiO_xMe_y$ layer having an RMS surface roughness of about 1 nm and preferably less than about 6 nm. The chamber is subsequently purged, and rehumidified to at least about 14 percent. After a 30-second stabilization period, dimethyldichlorosilane (DMDCS-$SiCl_2Me_2$) and Silicon Tetrachloride ($SiCl_4$) are added in to the chamber for a total of 5 minute. The amount of each reactant is about 1 to about 3 (e.g. 1 DMDCS to 3 $SiCl_4$) depending on the degree of durability or hydrophobicity or both desired. The reaction chamber humidity is adjusted to about 14%, and then held at a relatively constant humidity for about 5 minutes to then generate a crosslinked layer. The reaction chamber is subsequently evacuated after a final coating is applied, and the coated substrate is removed from the chamber. The initial advancing contact angle is greater than 60° and greater than 45° after 300 Taber Cycles.

Example XXVIII (Invention)

A glass substrate is cleaned using the procedure in Example XVII. The substrate is placed into a carrier and blown dry using dried compress air. The cleaned substrate is placed into the reaction chamber parallel to the gas flow. After a period to ensure stabilization of the humidity within the reaction chamber, about 30 seconds, trichloromethylsilane is introduced into the reaction chamber for about 5 minutes to generate a first layer of an $SiO_xMe_2$ layer having an RMS surface roughness of about 1 nm and preferably less than about 6 nm. The chamber is subsequently purged, and rehumidified to at least about 14 percent. After a 30-second stabilization period, dimethyldichlorosilane (DMDCS-$SiCl_2Me_2$) and Silicon Tetrachloride ($SiCl_4$) are added in to the chamber for a total of 5 minute. The amount of each reactant is about 5 parts to 1 part respectively (e.g. 5 DMDCS to 1 $SiCl_4$) depending on the degree of durability or hydrophobicity or both desired. The reaction chamber humidity is adjusted to about 14%, and then held at a relatively constant humidity for about 5 minutes to then generate a crosslinked layer. After an additional stabilization period of at least 30 seconds, methyltrichlorosilane (DMDCS) is introduced into the reaction chamber for an additional five minutes to provide a capping layer. The reaction chamber is subsequently evacuated, and the coated substrate is removed from the chamber. The initial advancing contact angle is greater than 100° and greater than 65° after 300 Taber Cycles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hydrophobic surface-coated substrate which comprises a substrate, a silicon oxide anchor layer on said substrate, and a hydrophobic coating layer covering a surface of said anchor layer, wherein said surface of said silicon oxide anchor layer exhibits a root mean square (RMS) surface roughness of less than about 6.0 nm and a haze value of less than about 2.0%.

2. The substrate of claim 1, wherein the anchor layer exhibits a RMS surface roughness of greater than about 4.0 nm.

3. The substrate of claim 1, wherein the hydrophobic coating further comprises the humidified vapor-deposited reaction product of at least one alkylchlorosilane applied over the anchor layer.

4. The substrate of claim 3, wherein the alkylchlorosilane is dimethyldichlorosilane or trimethylchlorosilane.

5. The substrate of claim 1, wherein the hydrophobic coating comprises a layer of a humidified vapor-deposited reaction product of dimethyldichiorosilane (DMDCS) on the silicon oxide anchor layer, and a layer of a humidified vapor-deposited reaction product of trimethylchlorosilane (TMCS) applied over the DMDCS layer.

6. The substrate of claim 1, wherein the hydrophobic coating comprises a layer of polydimethylsiloxane (PDMSO) chemically bound to said anchor layer.

7. The substrate of claim 1, wherein the hydrophobic coating comprises a layer of cross-linked polysiloxane chemically bound to said anchor layer.

8. The substrate of claim 7, wherein the hydrophobic coating comprises at least one layer which is the humidified vapor-deposited reaction product of dimethyldichiorosilane (DMDCS) or trimethyichiorosilane (TMCS) applied over the cross-linked polysiloxane layer.

9. The substrate of claim 1, wherein the anchor layer exhibits a haze value of less than about 1.5%.

10. A substrate as in claim 1, wherein anchor layer is comprised of a humidified reaction product of silicon tetrachloride vapor deposited at a relative humidity of less than about 50%.

11. The substrate of claim 10, wherein the silicon tetrachloride is vapor-deposited at a relative humidity of less than about 45%.

12. The substrate of claim 10, wherein the silicon tetrachloride is vapor-deposited at a relative humidity of less than about 40%.

13. The substrate of claim 10, wherein said hydrophobic coating is comprised of the humidified reaction product of said silicon tetrachloride and an alkylchlorosilane.

14. The substrate of claim 13, wherein said alkylchlorosilane includes trimethylchlorosilane (TMCS).

15. The substrate of claim 14, wherein said silicon tetrachloride and TMCS are vapor-deposited as a mixture.

16. The substrate of claim 15, wherein said mixture contains a ratio of said silicon tetrachloride to TMCS of between about 4.0:0.05 to about 4.0:1.5.

17. The substrate of claim 15, wherein said mixture contains a ratio of said silicon tetrachloride to TMOS of about 4.0:1.0.

18. A coated glass substrate made by a process comprising:
(a) contacting a surface of the glass substrate to be coated with a silicon tetrachloride vapor for a time sufficient to form a silicon oxide layer on the surface of the glass substrate; and then
(b) simultaneously contacting the silicon oxide layer with vapors of silicon tetrachloride and dimethyldichlorosilane (DMDCS) for a time sufficient to form a cross-linked layer of polydimethylsiloxane (PDMSO).

19. The substrate of claim 3, wherein the alkylchlorosilanes comprise dimethyldichlorosilane and methyltrichlorosilane.

20. The substrate of claim 3, wherein the alkylchlorosilanes are dimethyldichlorosilane and methyltrichlorosilane and are added in equimolar amounts.

21. The substrate of claim 19, wherein the ratios of dimethyldichlorosilane and methyltrichlorosilane are in the range of from 5 part to 1 part to about 1 part to 3 part respectively by weight.

22. The substrate of claim 19, wherein the alkyl chlorosilane layer is capped with methyltrichlorosilane.

23. The substrate of claim 19, wherein the alkyl chlorosilane layer is capped with $CF_2FCO(CH_2)_3SiCI_2CH_3$.

24. The substrate of claim 1 wherein the hydrophobic coating comprises a layer of a humidified vapor-deposited reaction product of dimethyldichlorosilane and methyltrichlorosilane on the silicon oxide anchor layer, and a capping layer of a humidified vapor-deposited reaction product of trimethyl chiorosilane applied over the DMDCS and TMCS layer.

25. The substrate of claim 3, wherein silicon tetrachloride is added to a reaction chamber in an equimolar amount with at least one alkylchlorosilane selected from the group consisting of dimethyldichlorosilane, methyltrichlorosilane, trimethylchlorosilane and chlorofluoroalkylsilane.

26. The substrate of claim 25 comprising $CF_2FCO(CH_2)_3SiCl_2CH_3$ as a capping layer.

27. The substrate of claim 1, wherein the anchor layer exhibits a RMS surface roughness of less than about 5.0 nm.

28. The substrate of claim 1, wherein the anchor layer exhibits a RMS surface roughness of between about 4.0 nm to about 6.0 nm.

29. A hydrophobic surface-coated substrate which comprises a substrate, a silicon oxide anchor layer on said substrate, and a hydrophobic coating layer covering a surface of said anchor layer, wherein said surface of said anchor layer exhibits a root mean square surface roughness of greater than about 4.0 nm and less than about 6.0 nm and wherein the hydrophobic coating layer is the humidified vapor-deposited reaction product of at least one alkylchlorosilane which is selected from the group consisting of dimethyldichlorosilane (DMDCS), methyichlorosilane (MCS) and trimethylchlorosilane (TMCS).

30. The substrate of claim 29, wherein the hydrophobic coating comprises a layer of a humidified vapor-deposited reaction product of DMDCS on the silicon oxide anchor layer, and a layer of a humidified vapor-deposited reaction product of TMCS applied over the DMDCS layer.

31. The substrate of claim 29, wherein the hydrophobic coating comprises a layer of polydimethylsiloxane (PDMSO) chemically bound to said anchor layer.

32. The substrate of claim 29, wherein the hydrophobic coating comprises a layer of cross-linked polysiloxane chemically bound to said anchor layer.

33. The substrate of claim 32, wherein the hydrophobic coating comprises at least one layer which is the humidified vapor-deposited reaction product of dimethyldichlorosilane (OMOCS) or trimethylchlorosilane (TMCS) applied over the cross-linked polysiloxane layer.

34. The substrate of claim 29, wherein the alkylchlorosilane includes dimethyldichlorosilane and methyltrichlorosilane in equimolar amounts.

35. The substrate of claim 29, wherein the alkylchlorosilane includes dimethyldichiorosilane and methyltrichlorosilane in ratios of dimethyldichiorosilane and methyltrichlorosilane within range of from 5 part to 1 part to about 1 part to 3 part respectively by weight.

* * * * *